INVENTOR
RICHARD C. STANLEY
BY Kimmel & Crowell
ATTORNEYS

Nov. 14, 1961  R. C. STANLEY  3,009,049
TELEVISION CONTROLLED INTERNAL PIPE WELDING APPARATUS
Filed Aug. 13, 1958  6 Sheets-Sheet 4
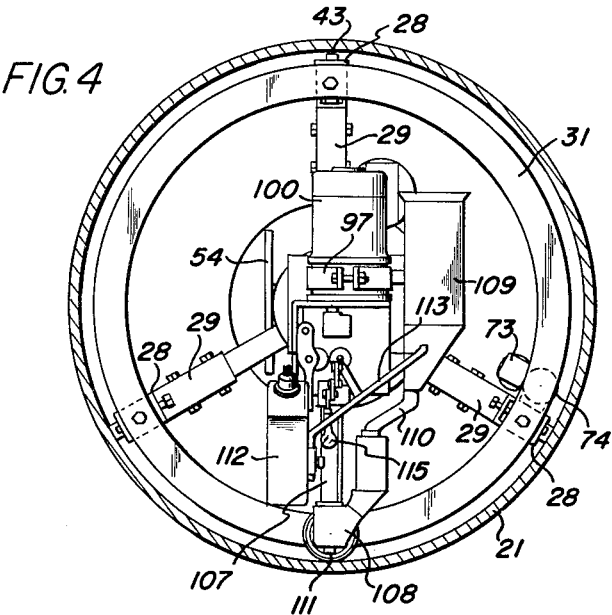
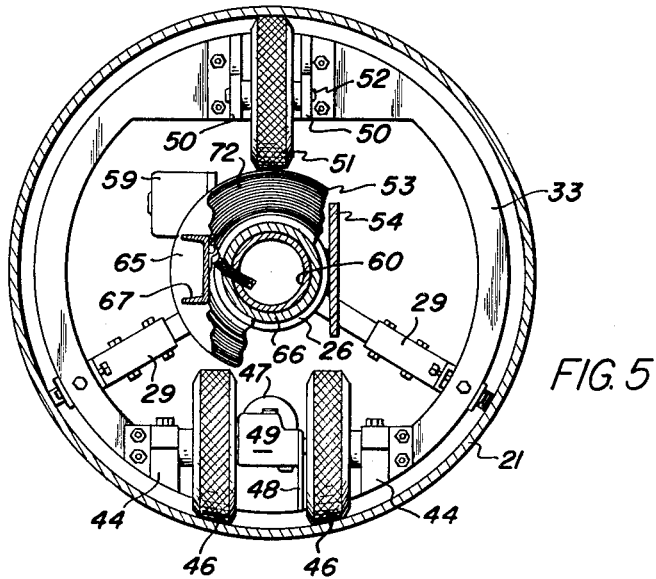
INVENTOR
RICHARD C. STANLEY
BY Kimmel & Crowell
ATTORNEYS Nov. 14, 1961 R. C. STANLEY 3,009,049
TELEVISION CONTROLLED INTERNAL PIPE WELDING APPARATUS
Filed Aug. 13, 1958 6 Sheets-Sheet 5

INVENTOR
RICHARD C. STANLEY

BY Kimmel & Crowell

ATTORNEYS

Nov. 14, 1961  R. C. STANLEY  3,009,049
TELEVISION CONTROLLED INTERNAL PIPE WELDING APPARATUS
Filed Aug. 13, 1958  6 Sheets-Sheet 6
FIG. 8
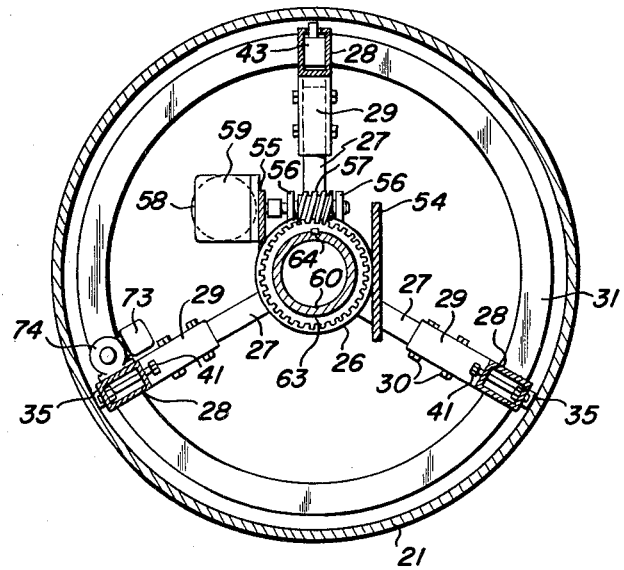
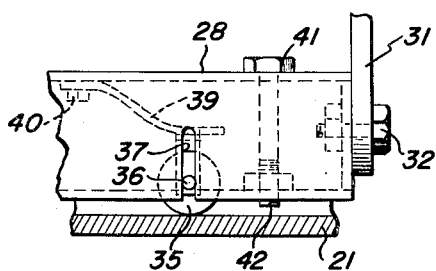
FIG. 10
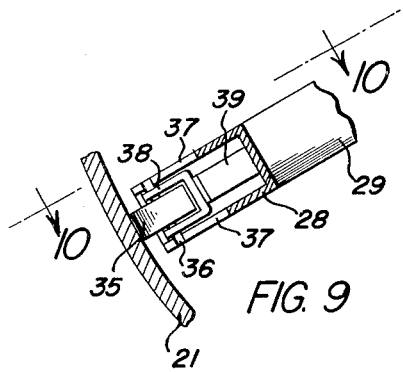
FIG. 9
INVENTOR
RICHARD C. STANLEY
BY Kimmel & Crowell
ATTORNEYS

United States Patent Office 3,009,049
Patented Nov. 14, 1961

3,009,049
TELEVISION CONTROLLED INTERNAL PIPE
WELDING APPARATUS
Richard C. Stanley, 936 S. 11th St., Gadsden, Ala.
Filed Aug. 13, 1958, Ser. No. 754,763
2 Claims. (Cl. 219—60)

The present invention relates to television controlled internal pipe welding apparatus for joining together pipe sections of a relatively large diameter in end-to-end relation.

The primary object of the invention is to provide an apparatus for welding pipe sections of a relative large diameter in end-to-end relation by means controlled from an external point under visual observation provided by a closed circuit television camera.

Another object of the invention is to provide in a welding apparatus of the class described above means for controlling the position of the welding apparatus, the relative rotation between the welding apparatus and the pipe, and the movement of the welding apparatus into and out of the pipe.

A further object of the invention is to provide a television controlled welding apparatus of the class described above which can be adjusted for use in pipes of varying sizes.

A still further object of the invention is to provide a television controlled pipe welding apparatus of the class described above which is inexpensive to manufacture, simple to use, and which provides a perfect joint between the adjacent pipe ends.

Other objects and advantages will become apparent in the following specification when considered in the light of the attached drawings, in which:

FIGURE 4 is a vertical cross-section taken along the line 4—4 of FIGURE 2, looking in the direction of the arrows showing the invention in end elevation.

FIGURE 5 is a vertical cross-section taken along the line 5—5 of FIGURE 2, looking in the direction of the arrows.

FIGURE 8 is a vertical cross-section taken along the line 8—8 of FIGURE 2, looking in the direction of the arrows.

FIGURE 9 is an enlarged fragmentary transverse cross-section taken along the line 9—9 of FIGURE 2, looking in the direction of the arrows.

FIGURE 10 is a fragmentary longitudinal section taken along the line 10—10 of FIGURE 9, looking in the direction of the arrows.

FIGURE 11 is a semi-diagrammatic diagram of the hydraulic circuits forming a part of the invention.

Figure 1:
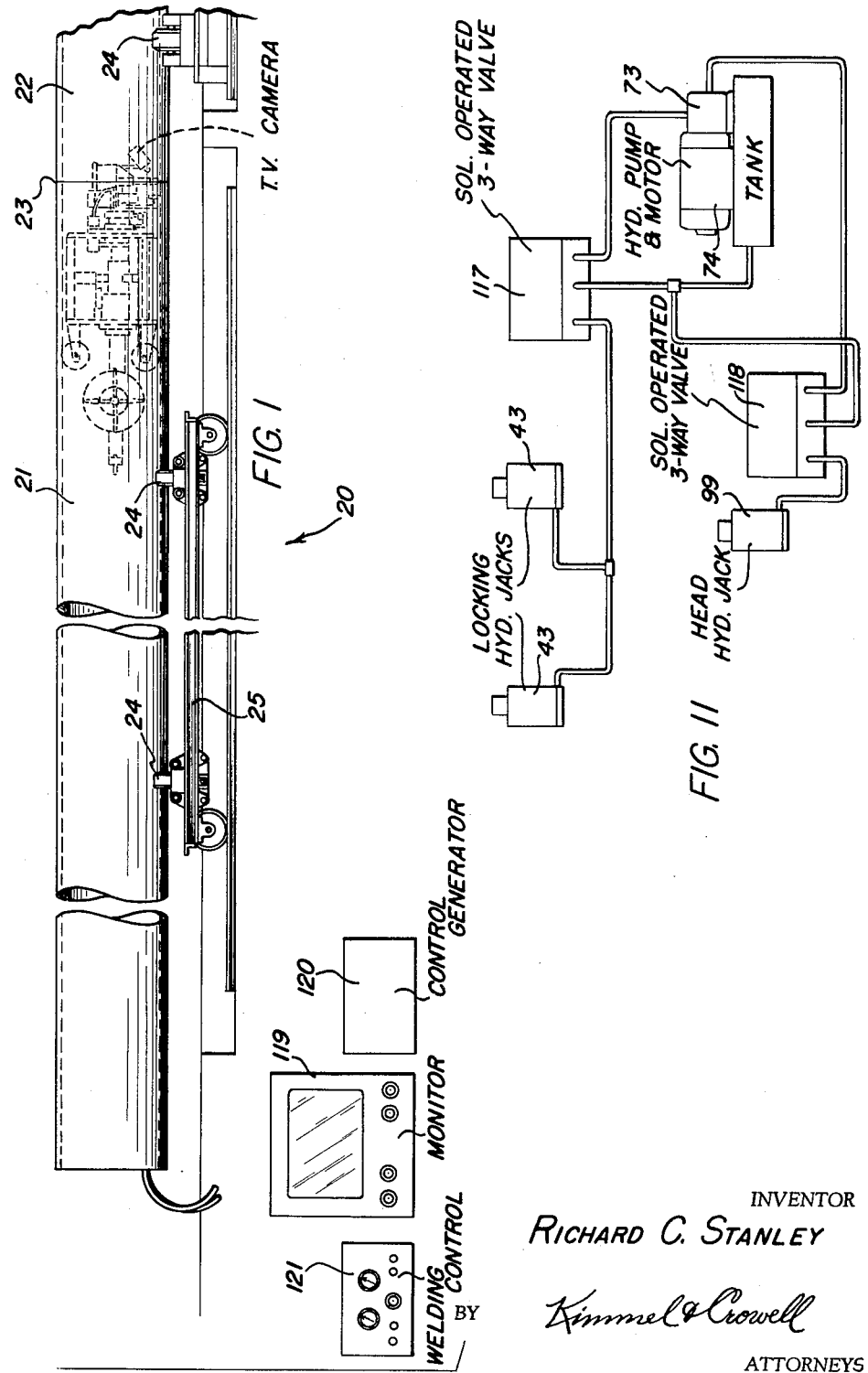
FIGURE 1 is a semi-diagrammatic side elevation of the invention shown in position within pipe sections to be welded together.
Figure 2:
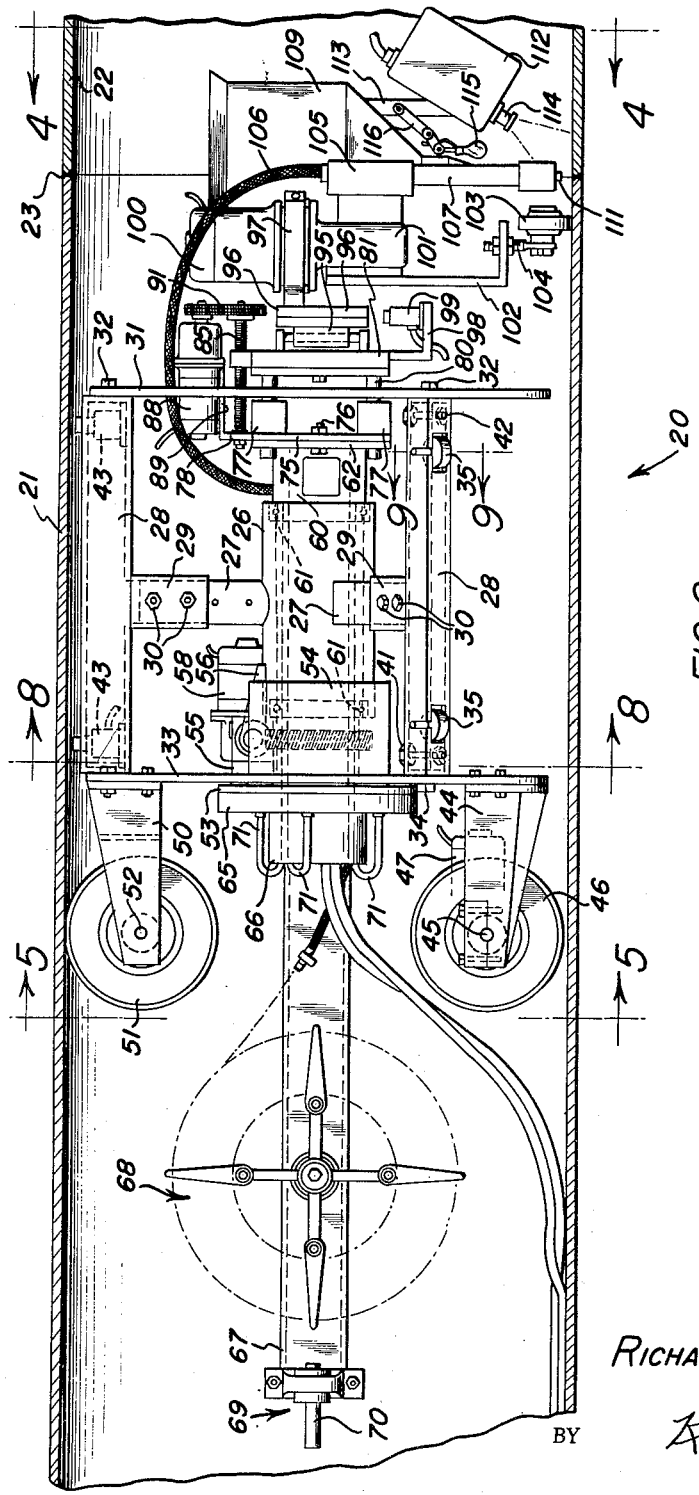
FIGURE 2 is a side elevation of the invention in position in the pipe to be welded with the pipe shown in vertical cross-section.
Figure 3:
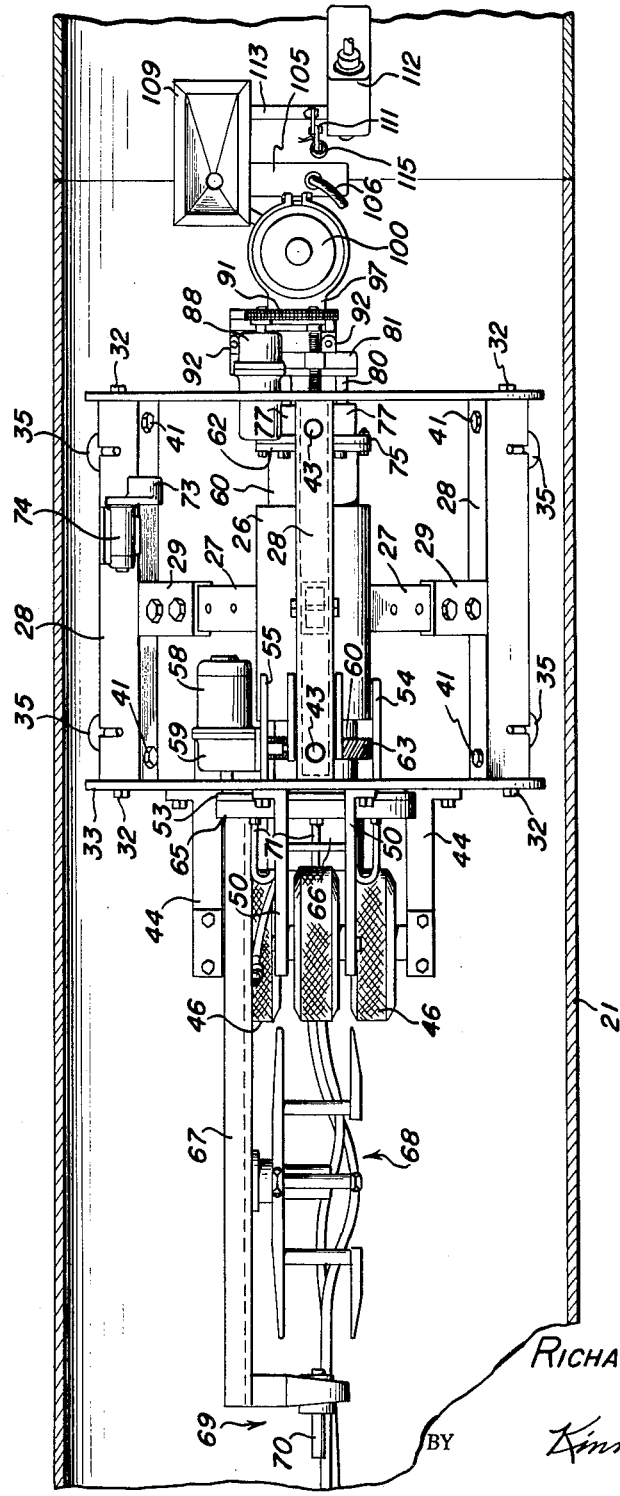
FIGURE 3 is a top plan view of the invention in position in the pipe to be welded with the pipe shown in horizontal section.
Figure 6:
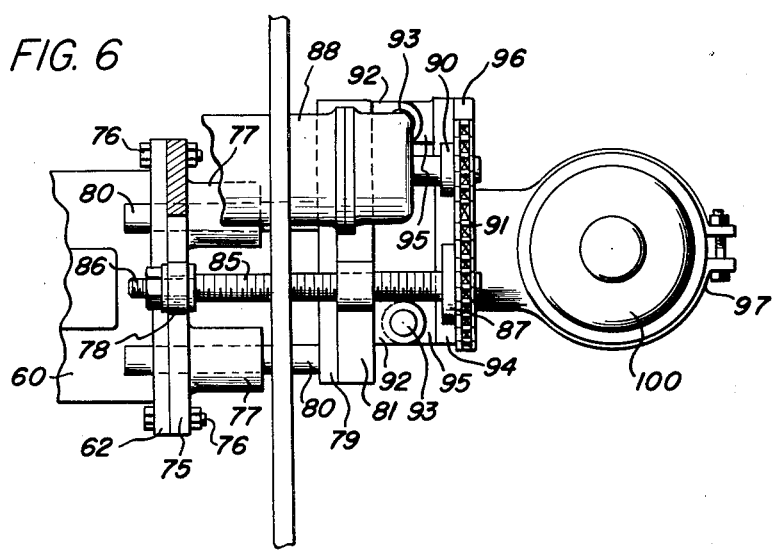
FIGURE 6 is a fragmentary enlarged top plan view of a portion of the invention.
Figure 7:
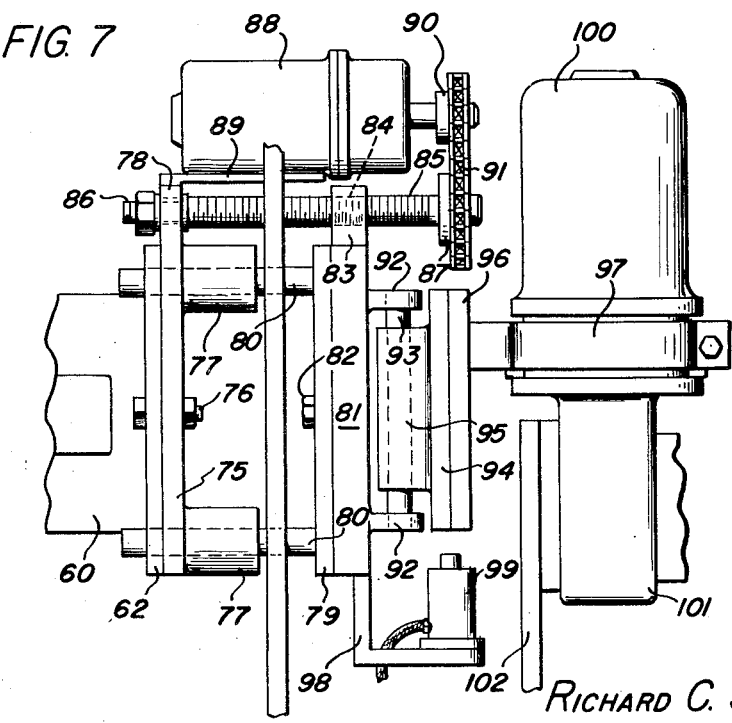
FIGURE 7 is a fragmentary side elevation of the structure illustrated in FIGURE 6.

Referring now to the drawings in detail wherein like reference characters indicate like parts throughout the several figures, the reference numeral 20 indicates generally a television controlled internal pipe welding apparatus constructed in accordance with the invention.

The pipe welding apparatus 20 is used for internally welding pipe sections 21, 22 together at 23. The pipe section 22 is supported for rotation on a plurality of rollers 24, and the pipe section 21 is supported by a plurality of rollers 24 mounted on a longitudinally movable carriage 25. The rollers 24 provide means for rotating the pipe sections 21, 22 during the welding operation.

The internal pipe welding apparatus 20 includes a central cylindrical frame member 26 having a plurality of radially extending arms 27 secured thereto in outwardly projecting relation. The arms 27 are circumferentially equispaced and each carry a longitudinally extending generally rectangular support 28. Each of the supports 28 are provided with a radially inwardly extending generally rectangular socket 29 telescoping over the arms 27. Bolts 30 secure the sockets 29 to the arms 27 to provide means for exchanging the supports 28 when desired. A ring 31 is secured to the supports 28 at one end by means of bolts 32, and a second ring 33 is arranged parallel thereto and secured to the opposite end of the supports 28 by means of bolts 34.

The lowermost supports 28 are provided with rollers 35 adjacent the opposite ends thereof mounted on a shaft 36 which extend oppositely through aligned slots 37 formed in the opposite sides of the support 28. The shafts 36 are mounted in U-shaped brackets 38 secured to a leaf spring 39 mounted in the support 28 by a bolt 40. An adjustable spacing bolt 41 is secured to the opposite ends of the support 28 and has the end 42 thereof adjustably projecting from the lower end of the support 28.

The uppermost support 28 is provided with a hydraulic ram 43 at each end thereof in position for engaging the internal surface of the pipe section 21. The lowermost supports 28 are normally supported on the rollers 35 to permit passage through the pipe 21, and on operation of the hydraulic rams 43 the rollers 35 move upwardly in the slots 37 until the ends 42 of the bolts 41 come in contact with the pipe section 21 to firmly position the supports 28 and the rings 31, 33 with respect to the pipe section 21.

The ring 33 is provided with a pair of rearwardly extending horizontal mounting blocks 44 arranged in spaced apart parallel relation and having a transversely extending axle shaft 45 journalled therein. A pair of rubber tired wheels 46 are secured to the shaft 45 in spaced apart relation in position to engage the inner surface of the pipe section 21. An electric motor 47 is supported on a bracket 48 extending outwardly from the ring 33 and is geared to the axle shaft 45 through a transmission 49. Rotation of the electric motor 47 being effective to rotate the rubber tired wheels 46 in either a forward or reverse direction.

A pair of spaced apart parallel mounting plates 50 are secured to the upper end of the ring 33 in rearwardly extending relation overlying the mounting blocks 44. A rubber tired wheel 51 is positioned between the mounting plates 50 and journalled on an axle 52. The rubber tired wheel 51 is arranged to engage the inner surface of the pipe section 21 at the top thereof oppositely of the rubber tired wheels 46.

A contact ring 53 is arranged slightly rearwardly of the ring 33 and is axially aligned therewith. The contact ring 53 is supported on a pair of rearwardly extending plates 54, 55 secured to the cylindrical frame 26 at their forward ends.

A pair of spaced apart parallel support brackets 56 are secured to the cylindrical frame 26 on the upper side thereof and extend rearwardly therefrom. The support brackets 56 have a worm gear 57 extending transversely thereof and journalled therein. An electric motor 58 is secured to a transmission 59 mounted on the rearwardly extending plate 55. The transmission 59 is operably connected with the worm gear 57 so that on rotation of the electric motor 58, the worm gear 57 will be rotated.

A tubular shaft 60 extends through and is journalled in the cylindrical frame 26 on bearings 61 at opposite ends thereof. The tubular shaft 60 is provided with a flange 62 at its forward end, for reasons to be assigned. A spur gear 63 is fixed to the tubular shaft 60 by means of a key 64 and is arranged in meshing relation with the worm gear 57, as best shown in FIGURE 8. Rotation of the worm gear 57 being effective to rotate the tubular shaft 60.

The tubular shaft 60 terminates at its rear end at a point spaced rearwardly from the ring 33. A second contact ring 65 is arranged in engagement with the contact ring 53 and has a cylindrical hub 66 extending rearwardly therefrom and mounted in fixed relation on the rear end of the tubular shaft 60.

A longitudinally extending horizontal channel bar 67 has its forward end fixed to the contact ring 65 and hub 66 by welding or the like. A welding rod reel, generally indicated at 68, is journalled on the channel bar 67 intermediate the opposite ends thereof. A swivel connector 69 is secured to the rear end of the channel bar 67 to support a handle 70 therein. A plurality of wires 71 are connected to the contact ring 65 and are arranged to have sliding electrical contact with the rings 72 on the contact ring 53.

A hydraulic pump 73 is mounted on one of the support members 28 and is driven by an electric motor 74 associated therewith.

A mounting head 75 is detachably and fixedly secured to the flange 62 by means of bolts 76. The mounting head 75 has a plurality of spaced apart parallel horizontally extending cylindrical bosses 77 secured thereto in laterally and vertically spaced relation. The mounting head 75 has an upstanding ear 78 secured to the upper edge thereof for reasons to be assigned.

A movable plate 79 is arranged in parallel relation to the mounting head 75 and has a plurality of rearwardly extending spaced parallel horizontal shafts 80 fixedly secured thereto and slidably mounted in the cylindrical bosses 77.

A vertical plate 81 is fixedly secured to the movable plate 79 by means of a bolt 82. The vertical plate 81 has an upstanding ear 83 formed thereon in aligned relation to the ear 78 and provided with a threaded bore 84 extending horizontally therethrough. A threaded shaft 85 is threaded through the threaded bore 84 and has a reduced end portion 86 thereof journalled in the ear 78 in longitudinally fixed position. The opposite end of the threaded shaft 85 has a sprocket 87 fixedly secured thereto.

An electric motor 88 is secured to a bracket arm 89 mounted on the mounting head 75. The electric motor 88 has a sprocket 90 secured thereto in aligned relation with the sprocket 87. A sprocket chain 91 is trained over the sprockets 87, 90 to provide means for the electric motor 88 to rotate the screw shaft 85 to move the vertical plate 81 longitudinally of the pipe section 21.

The vertical plate 81 is provided with two pairs of vertically spaced forwardly extending ears 92 carrying a pair of vertically extending spaced apart parallel fixed shafts 93 therein. A vertically adjustable plate 94 is arranged in parallel relation to the vertical plate 81 in forward spaced relation therefrom. A pair of spaced apart parallel vertically extending mounting bosses 95 are fixed to the vertically movable plate 94 in rearwardly extending relation thereon. The vertically elongated bosses 95 are slidably mounted on the shafts 93 for vertical adjustment thereon.

A motor mounting plate 96 is fixedly secured to the vertically movable plate 94 and is provided with a horizontally extending motor clamping plate 97.

An L-shaped bracket 98 is secured in depending relation to the mounting plate 81 and extends beneath the vertically movable plate 94. A hydraulic ram 99 is supported on the L-shaped bracket 98 in position to engage the vertically movable plate 94 and the motor mounting plate 96. Operation of the ram 99 is effective to raise the vertically movable plate 94 and the motor mounting plate 96 with the elongated bosses 95 sliding on the shafts 93.

An electric motor 100 is releasably supported in the motor clamp 97 and is provided at its lower end with a transmission 101. A depending L-shaped bracket 102 is secured to the transmission 101 and has a roller 103 secured to the lower end thereof for vertical adjustment thereon by means of a threaded shaft 104. The roller 103 is arranged to normally engage the inner surface of the pipe section 21 during rotation of the pipe section 21 with respect to the motor 100.

A welding electrode drive unit 105 is supported on the transmission 101 and is driven thereby. A flexible housing 106 is connected to the upper end of the drive unit 105 and extends through the tubular shaft 60 terminating adjacent the reel 68. A welding electrode guide tube 107 is arranged in depending relation to the drive unit 105 and is secured thereto terminating in a fitting 108 secured to the lower end thereof adjacent the surface of the pipe section 21.

A flux hopper 109 is secured in upright relation to the drive unit 105 and motor clamp 97 and is provided with a feed tube 110 extending downwardly and connected to the fitting 108 to feed powdered flux from the hopper 109 to the inner surface of the pipe section 21 in surrounding relation to a welding electrode 111 extending through the guide tube 107.

A closed circuit television camera 112 is secured to an arm 113 extending from the flux hopper 109. The television camera 112 is positioned with its lens 114 focused on the field immediately surrounding the contact area below the guide tube 107. A light bulb 115 is adjustably mounted on a linkage 116 carried by the arm 113 to provide illumination for the television camera 112 prior to the striking of the arc of the welding apparatus.

As best shown in FIGURE 11, solenoid operated three-way valves 117 and 118 are provided for controlling the flow of hydraulic fluids to the hydraulic rams 43 and 99.

In FIGURE 1 a television monitor 119 of conventional construction is positioned remotely from the point of weld and arranged to cooperate with the television camera 112 to provide a visual inspection of the weld area and the welding operation. A control generator 120 of conventional construction is provided for powering the control circuits of the device, and a remotely actuated welding control apparatus 121 is provided adjacent the television monitor 119.

The electric motors 47, 58, 88 and 100 are each individually controlled from the remotely actuated unit 121 in both a forward and a reverse direction. The electric motor 74 is similarly controlled from the unit 121 in a forward direction only. The solenoid operated three-way valves 117, 118 are also controllable from the unit 121 to actuate the hydraulic rams 43, 99 when desired.

In proceeding to internally weld pipe sections 21, 22 together at 23, the hydraulic ram 99 is actuated to raise the roller 103 out of contact with the pipe 21 and the welding apparatus 20 is moved through the pipe 21 on the wheels 46, 51 and rollers 35 driven by the motor 47. On reaching the seam 23 between the pipe sections 21, 22, the hydraulic rams 43 are actuated causing the bolts 41 to come in contact with the inner surface of the pipe section 21.

The hydraulic ram 99 is released to permit the roller 103 to come in contact with the pipe section 21 and the motor 88 is actuated to move the horizontally movable mounting plate 79 to align the guide tube 107 exactly with the seam 23. The pipe sections 21, 22 are then revolved on rollers 24 carrying the rings 31, 33 therewith.

The electric motor 58 is actuated to drive the tubular shaft 60 in a reverse direction to that of the movement of the pipe sections 21, 22 to maintain the guide tube 107 vertical at all times.

Flux is gravity fed from the hopper 109 and the welding electrode 111 is fed by the feeding unit 105 through the housing 106 from the reel 68.

As the welding proceeds it is viewed by the television camera 112 and by the operator through the monitor 119 to make sure that the guide tube 107 remains vertical.

The speed of the motors 58 and 100 can be controlled as desired through the control unit 121 to maintain the guide tube 107 in its desired position and to provide a desired feed for the welding rod electrode 111.

With this apparatus, the position of weld and the resulting molten metals are always maintained at the lowermost position of the pipe sections 21, 22 so that the molten material does not run from the seam 23. When the welding of the seam 23 is completed and it is desired to move the welding apparatus 20 from the pipe sections 21, 22, the ram 99 is actuated to raise the roller 103 out of contact with the pipe sections 21, 22 and the rams 43 are released to permit the welding apparatus 20 to again be supported on the rollers 35. In this position, the wheels 46, 51 are effective to move the welding apparatus 20 longitudinally of the pipe section 21 on operation of the motor 47.

Having thus described the preferred embodiment of the invention, it should be understood that numerous structural modifications and adaptations may be resorted to without departing from the scope of the appended claims.

What is claimed is:

1. An internal pipe welding apparatus for internally welding together adjacent pipes while the pipes are rotated about their longitudinal axis, comprising a framework, remotely controlled means for releasably securing said framework to the inner surface of a pipe section to be welded with said framework rotating therewith, an electric welding unit journalled in said framework, remotely controlled means on said framework for rotating said electric welding unit with respect to said framework to maintain the point of weld of said welding unit at the lowermost point of said pipes and hydraulically actuated remotely controlled means for vertically adjusting said welding unit with respect to the pipe section to permit moving of the welding apparatus into and out of contact with said pipe section.

2. A device as claimed in claim 1 wherein said welding unit is longitudinally adjustable with respect to said framework, and an electric motor controlled from a remote point outside of the pipe section is provided for controlling the longitudinal adjustment thereof.

References Cited in the file of this patent

UNITED STATES PATENTS

| | | |
|---|---|---|
| 1,846,470 | Burnish | Feb. 23, 1932 |
| 1,869,351 | Lincoln | July 26, 1932 |
| 2,428,161 | House | Sept. 30, 1946 |
| 2,557,046 | Evans | June 12, 1951 |
| 2,655,585 | Brown | Oct. 13, 1953 |
| 2,874,263 | Williams | Feb. 17, 1959 |
| 2,906,852 | Cornell | Sept. 29, 1959 |

OTHER REFERENCES

"TV Spots Build-Up On Resistance Electrodes," Welding Engineer, January 1957, pp. 24–25.